(12) United States Patent
Jungnickel et al.

(10) Patent No.: US 7,760,814 B2
(45) Date of Patent: Jul. 20, 2010

(54) INDOOR RADIO TRANSMISSION METHOD FOR PARALLEL RADIO TRANSMISSION OF DIGITAL DATA SUBSTREAMS AND A MOBILE RADIO TRANSMISSION SYSTEM

(75) Inventors: Volker Jungnickel, Berlin (DE); Udo Krueger, Berlin (DE); Volker Pohl, Berlin (DE); Clemens von Helmolt, Berlin (DE); Thomas Haustein, Berlin (DE); Slawomir Stanczak, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 1281 days.

(21) Appl. No.: 10/471,938

(22) PCT Filed: Mar. 15, 2003

(86) PCT No.: PCT/DE02/01019

§ 371 (c)(1),
(2), (4) Date: Feb. 24, 2006

(87) PCT Pub. No.: WO02/075953

PCT Pub. Date: Sep. 26, 2002

(65) Prior Publication Data

US 2006/0209978 A1  Sep. 21, 2006

(30) Foreign Application Priority Data

Mar. 15, 2001  (DE) ................. 101 14 052

(51) Int. Cl.
*H04L 1/02* (2006.01)
(52) U.S. Cl. .............. 375/267; 375/260; 375/347; 455/101; 455/132; 455/296; 455/500; 370/334

(58) Field of Classification Search ................. 375/267, 375/347; 455/101, 132, 296
See application file for complete search history.

(56) References Cited

U.S. PATENT DOCUMENTS

| 6,101,176 | A  | * | 8/2000  | Honkasalo et al. | .......... 370/335 |
|-----------|----|---|---------|------------------|--------------------|
| 6,952,455 | B1 | * | 10/2005 | Banister         | ..................... 375/267 |
| 2002/0118781 | A1 | * | 8/2002 | Thomas et al. | .............. 375/347 |
| 2002/0122381 | A1 | * | 9/2002 | Wu et al. | ..................... 370/208 |

(Continued)

OTHER PUBLICATIONS

G.D. Golden et al "Detection algorithm and initial laboratory results using V-Blast space-time communication architecture" Electronics Letters vol. 35 Jan. 1999 pp. 14-15.*

(Continued)

*Primary Examiner*—David C Payne
*Assistant Examiner*—Leon Flores
(74) *Attorney, Agent, or Firm*—Staas & Halsey LLP

(57) ABSTRACT

A radio transmission method and a wireless transmission system comprising multiple transmitter and receiver antennae simultaneously operating within the same frequency range and space-time encoders and decoders. Data transmission and channel matrix measurement can take place synchronously. Characteristic pilot signals that are unequivocally recognizable are superimposed with low noise on the data subsignals in the transmitter and are used in the receiver for the analog measurement of the channel matrix in a weighting unit and for the analog recovery of the transmitted data subsignals from the received signals. The measured analog values are digitally processed in a signal processor. The weightings thus determined are then summed in an analog signal processing unit.

10 Claims, 5 Drawing Sheets

U.S. PATENT DOCUMENTS

2002/0181558 A1* 12/2002 Ogawa et al. ............... 375/147

OTHER PUBLICATIONS

V. Jungnickel et al "Performance of a MIMO System with Overlay Pilots" IEEE Nov. 2001.*

"Broadband Radio Access Networks (BRAN); HIPERLAN Type 2; Physical (PHY) layer", ETSI Technical Specification 101 475 V1.1.1, Apr. 2000.

Evci, C., et al., "AWACS: System description and main project achievements", 4$^{th}$ ACTS Mobile Communications Summit, vol. 1, pp. 63-69, 1999.

Kuhwald, Thomas, et al., "A Constrained Beam Forming Algorithm for 2D Planar Antenna Arrays", IEEE Vehicular Technology Conference, pp. 1-5, Sep. 1999.

Jelitto, Jens, et al., "From Smart Antennas to Reduced Dimension Space-Time Processing", European Wireless Conference EW2000, Sep. 12-14, 2000.

Foschini, Gerald J., "Layered Space-Time Architecture for Wireless Communication in a Fading Environment When Using Multi-Element Antennas", Bell Labs Technical Journal, vol. 1, No. 2, pp. 41-59, Autumn 1996.

Peterson, W.W., et al., "Error-Correcting Codes", MIT Press, Cambridge, MA, 1972.

Gold, R., "Optimal Binary Sequences for Spread Spectrum Multiplexing", IEEE Trans. Inform. Theory, IT-13, pp. 619-621, 1967.

Lee, J.S., et al., "CDMA Systems Engineering Handbook", Artech House, pp. 656-663, 1998.

* cited by examiner taps (SR$_1$) 1,6,10,14
taps (SR$_2$) 1,2,3,6,8,9, 10,11,13,14

INDOOR RADIO TRANSMISSION METHOD FOR PARALLEL RADIO TRANSMISSION OF DIGITAL DATA SUBSTREAMS AND A MOBILE RADIO TRANSMISSION SYSTEM

BACKGROUND OF THE INVENTION

The invention relates to a method of indoor radio transmission for the parallel radio transmission of digital substreams formed by space-time encoding as a function of a selected data modulation format relative to a number n of data signals, in a multi-path transmission channel of limited frequency between a number of n transmission paths and a number m (m≦n) reception paths positioned at various sites within the indoor space with a measurement of the elements of the complex valued channel matrix for estimating the space-time-behavior of the transmission channel and space-time signal processing in the receiving paths while determining a weighting matrix derived from the complex valued for the simultaneous recovery of the data subsignals which by space-time encoding are again formed into digital data substreams, and to a mobile radio transmission system.

Wireless transmission channels are not without flaws. Echoes of signals at the receiver result in superimposition and interferences which limit the useful band or channel width of a carrier modulated with data to a value below the frequency range licensed to an individual offeror. Overcoming this channel limitation constitutes a first step towards higher transmission capacities in wireless networks. A method currently employed to this end is multi-carrier modulation in which the transmission capacity is in principle only limited by the permissible frequency range. Yet in future, wireless networks are to be available for many users in commerce and industry at data rates of 100 Mbit/s, similar to those known from land-line networks. However, the licensed frequency range cannot accommodate this. Wireless transmission systems which spatially and chronologically process transmission signals and which are thus of a high spectral efficiency, appear in this context to offer the best possibilities for further increasing the capacity of wireless networks.

Conventional receivers make use of omnidirectional antennae which in addition to the direct transmission signals ("line of sight" LOS) collect a number of echoes. Depending upon the receiving position, these superimposed signals are of different amplitudes and phases, so that the total signal is subject to a strong spatial variation known as "fading". Fading constitutes the problem typical of wireless transmission which conventionally is sought to be overcome by a multiple so-called "diversity reception". Lately, "frequency expansion techniques" are being applied which make use of the fact that fading is a frequency selective narrow-band phenomenon. Broadband signals can at least partially compensate the spatial signal changes. In modern transmission systems the carrier is modulated by digital signals. The direct signal and its echo reach the receiver with different delays. Significant cross-talk of successive data bits is only detected if the bit duration approaches the range of the transmission expansion $\tau_{delay}$ which is defined as the second static moment in the channel pulse response and which is inversely proportional to the channel band width B, calculated as $$B = \frac{1}{2\pi\tau_{delay}}$$

The bandwidth useful for the modulation is limited to about the channel bandwidth B. In normal indoor spaces, the value may be at a few megahertz, particularly when the direct signal is absent. Superfast data transmission on a single carrier frequency may therefor be realized by a modulation scheme of high spectral efficiency. This, however, leads to a reduced sensitivity of the reception.

By exceeding the limits of the channel, the transmission capacity can be increased by the use of several carrier frequencies. Orthogonal frequency division multiplexing (OFDM) is a method often used to modulate several carrier frequencies. In this, individual transmitted symbols may have extreme peak values which can only be transmitted by dear broadband amplifiers of high linearity. But the spectral limits can also not always be reached by OFDM. For instance, in the ETSI HIPERLAN/2-Standard, OFDM subcarriers are used within a bandwidth of 20 MHz. The entire spectrum from 200 or 255 MHz in accordance with the lower and upper 5-MHz-ISM-frequency band is not available for individual users, since in normal circumstances only of nineteen nominal carrier frequencies is used for transmission. Depending upon the channel quality, the data rate is set, by changing the spectral efficiency of the OFDM-subcarrier modulation, to values from 6 Mbit/s to 54 Mbit/s [1]. If, however, in a commercial environment more than nineteen users are connected to a base station, the available time window and, hence, the data rate per user, is but a fraction of these values. A possible relief is to increase the number of base stations by reducing the range covered by them. Overall, a comprehensive optimization of transmission conditions for indoor applications is predicated on an increase of the infrastructure.

A new degree of freedom for the capacity of the system is achieved by spatial diversification. For instance, in a tracked directional link the user's position is tracked by transmission of a directional beam. Multiple connections of base stations with mobile users at different locations may be served by the simultaneous use of equal frequencies. Directional beams reduce the number of undesired links, echoes and other interference signals. The advantages of directional antennae thus improve the quality of the links. In sight link arrangements, base band processing is also simpler than it is in an OFDM. Owing to the reduced number of signal echoes, the sight links makes available the entire band width of the permissible spectrum for modulating a single carrier frequency. However, this requires the power beamed in by the sight link to be significantly higher than from all other signals. The required beam width typically is 10° in order to raise the "Rice factor" K (Power ratio of the signal of the sight link relative to the sum of the signals of all echoes) above the steep threshold at 15 dB, at which the transmission expansion is abruptly reduced [2].

Directional beams may be provided, for instance, by horn aerials aimed at the base station. However, mobile users may not easily accept the alignment procedures (tracking) required for the network connection. A system for the automatic positional determination and alignment, especially at the base station, appears to be rather more promising. Thus, there have been attempts involving arrays of aerials in which the complex valued amplitude of each element is measured. From this, special signal processing algorithms can calculate the direction of the incoming planar wave of the sight link. Each areal signal is then multiplied by a complex weighting, and all signals are summed. This linear combination of the areal signals is physically equivalent to directing a beam directed to a target positioned in the desired direction) beam formation) [3].

This proposal for solving the problem appears not to be practicable in connection with wireless networks in indoor spaces. A large number of antenna elements (10×10) is required in order two-dimensionally to achieve a beam width of 10°, and the requirements put on the signal processor for defining an tracking a position are very high. Trials with digital signal processors for accommodating high data rates have failed at only a fraction of the required antenna elements. The processor design currently possible allows data rates of 1.5 Mbit/s with eight antenna elements [4]. In view of these results it does not seem possible in the foreseeable future with 10×10 antenna elements to achieve a data rate of 100 Mbit/s.

For high data rates, hardware implementations will thus have to be taken into consideration for the processing of data. An approach for simplifying signal processing which makes use of several preformed signal beams is realized by a hardware-configured matrix in accordance with Butler placed in front of the array of aerials. This allows realization of an array of antennae of a switchable signal beam. The receiving direction will then be found by scanning all outputs of the Butler matrix for the best signal which is then switched through to the receiver. The complexity of the Butler matrix quickly increases, however, as a function of the number of outputs. Each antenna signal is individually delayed before it reaches an output and is then summed with all other signals. For that reason, a Butler matrix with 10×10 outputs would require 10,000 delay branches. Realization of such a network would appear not to be reasonable. Moreover, a 10×10 antenna array for 5 GHz which at a space of 3 cm ($\lambda$/2) between antennae covers an area of 30×30 cm$^2$, is too large for mobile stations so that the described technology is either reserved for stationary base stations or must be limited to mm wavelengths.

The state of the art upon which the invention is based proceeds from the transmission method and transmission system according to Foschine et al. as described in EP-A2 0,951, 091 and the [5] and [6] papers. The wireless transmission system for indoor applications known therefrom (for better distinction hereinafter referred to as "BLAST" method) is based on time-space signal processing for a transmission system having a plurality of antennae on its transmission and receiving side (multi-element antennae, multiple-input/multiple-output—MIMO— system). However, it is not the bandwidth of the transmission channel which is enlarged in the BLAST method, but the spectral efficiency as a measure of the data rate transmissible within a band width of 1 Hz. In it, spectral efficiency and transmission capacity increase linearly with the number of parallel transmission paths. The principle of the MIMO data transmission may be gleaned from FIG. 1 for n transmission antennae and m receiving antennae with a total of n×m parallel transmission paths. On the transmission side an incoming data stream is divided by a space-time encoder into a number corresponding to the number of transmission antennae. These are wirelessly transmitted as data signals chronologically and spatially parallel on the same carrier frequency. At the receiving side the superposed data signals are detected at different positions of the indoor space by receiving antennae the number of which is greater than or equal to the present transmission antennae (m$\leq$n). In this connection, the indoor space, being a short distance transmission range, displays normal transmission behavior free of unusual superpositions, strong attenuations and interferences by moving objects. Nevertheless many echo signals contribute to the transmission signal. For that reason it may be assumed that at sufficient distance between the antennae the received signals are statistically independently and randomly distributed (distribution in a sight link according to Rice or Raleigh where no sight link is given).

In the following explanations which contribute to the basic understanding of the BLAST method upon which the invention is based, the transmitted signals are designated by the transmission vector S with components $S_1$. After wireless transmission the components $E_1$ of the receiving vector E are calculated as $$E_i = \sum_{j=1}^{n} H_{ij} S_j + N_i$$

where $H_{ij}$ are elements of the complex valued channel matrix [H] and $N_i$ is the noise contribution in the $i^{th}$ receiving path. The channel matrix estimates the actual transmission behavior of the indoor space as a multi-path transmission channel. In the BLAST method training vectors are transmitted periodically to determine the channel matrix. Since in a natural environment, uncorrelated transmission signals are very probable, in most cases a number of linear equations, which are independent of each other, corresponding at least to the number of transmission antennae, may be established. In this manner, the channel matrix receives all the information necessary for reconstructing, on the receiving side, the transmission signal from the received data signal. In the known wireless transmission method, this is carried out by singular eigenvalue division (SVD) and subsequent iterative extinction of interference.

The BLAST method is based on a special physical model. The method successfully utilizes the non-frequency selective so-called "flat fading" for improving the system capacity. In indoor space represents a microwave resonator with partially reflective surfaces. The modes of this resonator differ in their spatial field distribution as well as in their center frequency. One carrier frequency usually excites about 10,000 modes (the spectral line width of a single mode is comparable to the channel band width B). As a result of the mode field distribution, every transmitter excites different linear combinations of modes which at different sites of the space where the receivers are positioned, additionally blank each other with different amplitude and phase and are thus linearly independent. The BLAST method utilizes these spatially conditioned differences in the composition of the receiving signals for reconstructing the original signals.

At a high signal to noise ratio, the BLAST method operates with eight transmission antennae and twelve receiving antennae and a sixteen QAM transmission (QAM: quadrature amplitude modulation) as the selected data modulation format. This is said to lead to spectral efficiencies of up to 40 bit/s per Hz at bit error rates in the range of 1%. However, for measuring the channel matrix and data transmission, the known method utilizes alternating time periods, so that 20% of the achievable effectiveness is lost again. In addition, space-time processing in real time is performed with a digital signal processor which limits the data throughput to less than 1 Mbit/s. Yet it would be possible, with the eight parallel transmission channels in indoor spaces to achieve a total data throughput of several 10 Mbit/s up to 100 Mbit/s and more. However, in the near future it seems unlikely that such data rates will be achieved with data processing based on a digital signal processor, such as the known BLAST method. A high data rate is, however, of particular interest for multimedia applications (videos, computer communications, etc.) or a basic requirement for their applications. Mobile communications systems have to be frugal with the frequency resources allotted to them. As has already been mentioned, however, a high data rate for multimedia applications is desired at the same time, especially in the so-called indoor area. This requires a high spectral efficiency which must be paired with an efficient transmission technology. Because of the multiple reflections of the wireless waves, the channel band width is typically restricted to about 5 MHz. Proceeding from the known BLAST method as a similar method, which already requires fewer antenna arrays than directional sight links, it is thus an object of the method according to the invention within this "natural;" band width to transmit data at very high transmission rates in a range of 100 Mbit/s. This requires achieving a spectral efficiency of 20 bit/s per Hz. A suitable transmission system for executing the method must be correspondingly efficient and be capable of signal processing at very high rates.

SUMMARY OF THE INVENTION

In the accomplishment of this object, a wireless transmission method of the kind referred to above provides for marking each transmission path by an unambiguously recognizable pilot signal of known structure, coding and good correlation properties which is superimposed with low interference as a marking pilot signal on a given data subsignal, and the superimposition is transmitted as a transmission signal, carrying out the measuring of the elements of the complex valued channel matrix simultaneously with the parallel transmission of the transmission signals and basing it on the pilot frequency the transmitted structures of which are measure in each receiving path and correlated with the known structures, and, for its recovery, representing each data subsignal as an analog weighted linear combination of all receiving signals, the analog weighting signals being elements of a weighting matrix to be determined on the basis of the complex valued channel matrix by means of a geometric projection technique of purely algebraic structure.

In the wireless transmission method the channel estimation is separated from the data transmission by the simultaneous execution of both operations. The channel matrix for recovering the original data subsignals is accurately measured in real time with the transmission thereof. In this manner, the entire available spectral efficiency is made available for the data transmission. Time gaps in the data transmission, as those present in the known BLAST method in consequence of the alternatingly executed transmission of training sequences for measuring the channel matrix, do not occur. In the method in accordance with the invention, the entire multi-path transmission channel may be utilized without interruptions for transmitting data; the data subsignals are being transmitted continuously. The channel matrix is simultaneously measured at a period adjusted to the required accuracy. The method of accurately measuring the channel matrix is based upon the introduction of an additional signal which is weak compared to the data subsignal and which is modulated with the pilot signal characteristic of each transmission antenna. A weak specially encoded and well recognizable pilot signal is superimposed on each data subsignal. At this point, it is to be mentioned that the greatest gain in spectral efficiency may be achieved by a simultaneous transmission. In individual cases, it may, however, be advantageous to transmit the pilot signal alternatingly and in time slot provided therefor, without any substantial loss of efficiency. One advantage in this connection is the somewhat more efficient generation of the pilot signals relative to the data subsignals.

In the transmission method in accordance with the invention, all processes mentioned are carried out in an analog manner; only the weighting values are digitally calculated from the channel matrix in order simultaneously to achieve a numerical suppression of interferences in accordance with a known algorithm. By foregoing a recursive suppression of interferences, signal processing may, however, be designed decisively simpler than in the known BLAST method. The linear combination of the receiving antennae signals as a decisive tool for recovering the original signals is carried out in an entirely analog manner for significantly expanding the data throughput. As a consequence of this purely algebraic structure, the transmission method in accordance with the invention may be practiced in real time. The digital processing of the signals takes place only because of the setting of the weighting values in the linear combination; time-limiting digital scanning directly in the data path does not occur any more.

Advantageous improvements of the method in accordance with the invention, especially as regards the structure of the pilot signal, the analog signal recovery at the receiving side, the data signal modulation at the transmission side, the type of weighting matrix and the extraction of the pilot signals during signal recovery for reducing the bit error rate and for expanding the pilot signal power ($k \rightarrow 1$), may be gleaned from the subclaims. To avoid repetitions, attention is directed to the specific portion of the specification which in connection with the corresponding figures deal in detail with the individual improvements.

The present invention relates, moreover, to a mobile wireless transmission system for the indoor range for parallel wireless transmission of digital partial data streams in a frequency limited multi-path transmission channel between individual transmission and receiving antennae, with a transmitter which incorporates multi-element-antennae for a number n of locally dependent parallel transmission paths and a space-time-encoder in a transmission side signal processing unit, and a receiver which incorporates multi-element-antennae for a number m ($m \geq n$0locally dependent parallel receiving paths, a device including a digital signal processor for measuring the complex valued channel matrix and a space-time-encoder in the receiving side signal processing unit.

The basis-forming state of the art is identical to the state of the art discussed in connection with the transmission method in accordance with the invention. A method is always closely connected with an arrangement for practicing the method, so that the problem of creating a powerful system of a high signal processing rate has already been discussed in connection with the superior object of achieving a high data rate. Further factor of the object relate basically to a function-oriented advantageous structure and the costs of the transmission system.

For that reason, in a mobile wireless transmission system of the kind described above, the transmitter, for executing the wireless transmission method in accordance with the invention, is provided in each transmission path with a pilot signal generator for generating an unambiguously recognizable pilot sequence for marking the transmission path and an injector for superimposing on a given transmitted data subsignal in the transmission path a pilot signal generated from the marking pilot sequence, the receiver is provided in each receiving path with a branch through which a given received signal is input as a monitor signal of a weighting unit provided in each transmission path for detecting analog weighting signals and with an analog signal combining unit across all receiving paths into which flow the analog weighting signals, and each weighting unit is provided with correlation circuits of a number corresponding to the actual transmission paths, each correlation circuit having a pilot signal generator for measuring the structure of the relevant received pilot signal and with a digital signal processor common to all weighting units for detecting the complex valued channel matrix and the weighting matrix resulting therefrom, as well as with a complex value modulator for superposing the analog weighting signal on the relevant received signal.

In this mobile wireless transmission system, essential components of the signal processing are executed as hardware which in addition to the high spectral efficiency, also makes possible the high transmission rate. The processing network numerically weighted by means of the digital processor is realized completely by circuit technology. The utilization of simple signal generators with shift registers in accordance with an advantageous embodiment of the mobile transmission system makes possible an economical circuit structure substantially immune from interferences for measuring the channel matrix with a highly accurate signal recovery. In connection with the mobile transmission system, attention also is directed to the specific portion of the specification in order to avoid repetitions.

BRIEF DESCRRIPTION OF THE DRAWINGS

These and other objects and advantages of the present invention will become apparent and more readily appreciated from the following description of the preferred embodiments, taken in conjunction with the accompanying drawings of which:

DETAILED DESCRIPTION OF THE PREFERRED EMBODIMENTS

Figure 1:
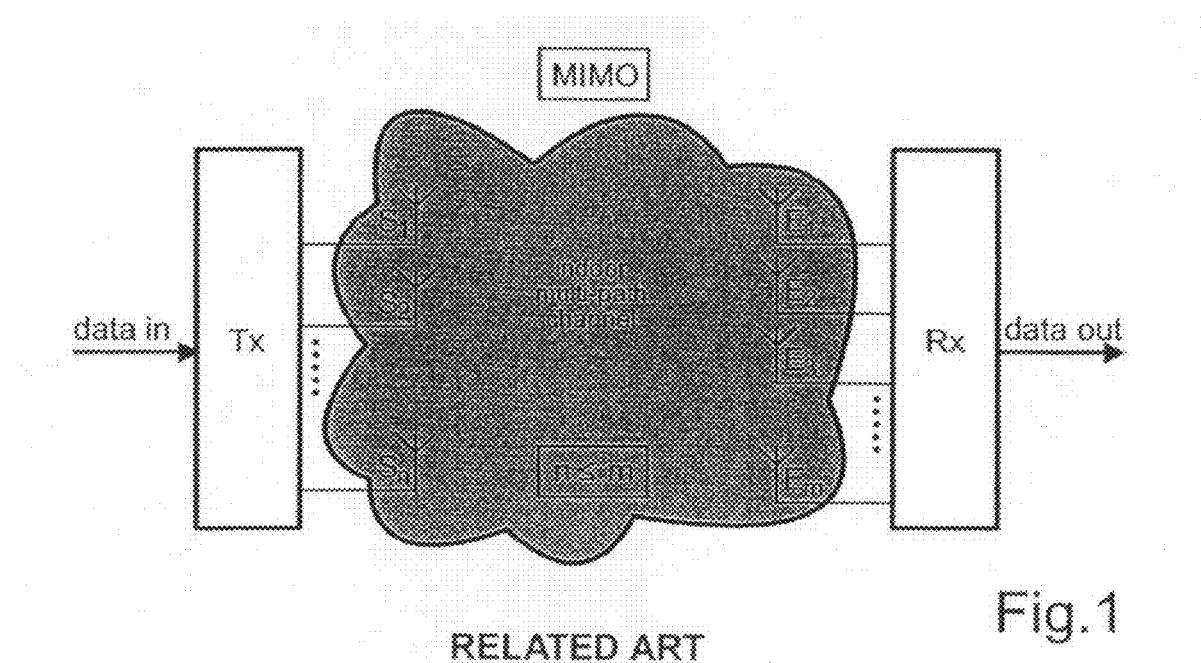
FIG. 1 depicts the structure of a MIMO system.

Reference will now be made in detail to the preferred embodiments of the present invention, examples of which are illustrated in the accompanying drawings, wherein like reference numerals refer to like elements throughout. FIG. 1 depicts the structure of a multiple input/multiple output system MIMO as is known from the state of the art, with the relation of a transmitter Tx at the transmission side to a receiver Rx at the receiving side over a multipath transmission channel in an indoor space.

Figure 2:
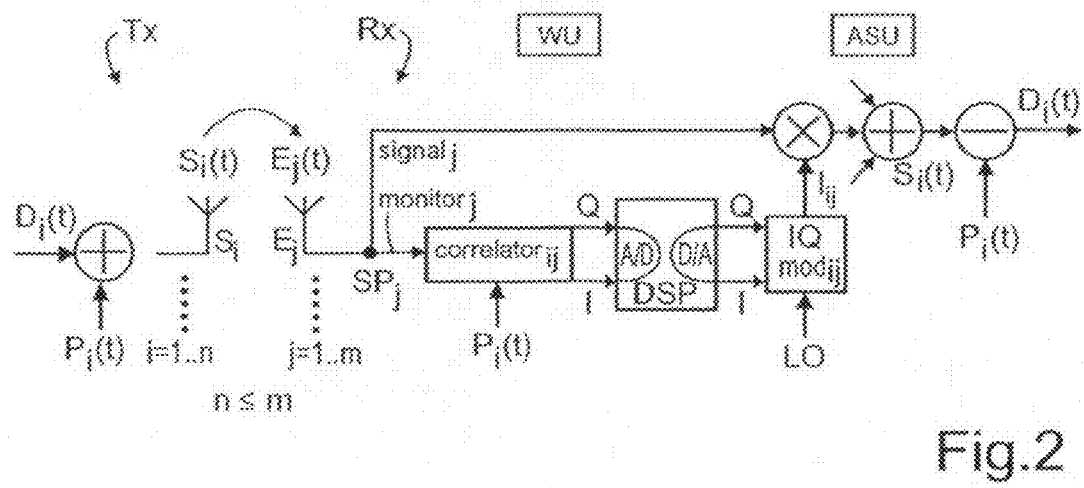
FIG. 2 depicts the basic scheme of the transmission method and system in accordance with the invention.

FIG. 2 depicts the basic scheme of the transmission method and system TS in accordance with the invention which will hereafter be explained in greater detail.

Superimposing of Pilot Sequences

Figure 3:
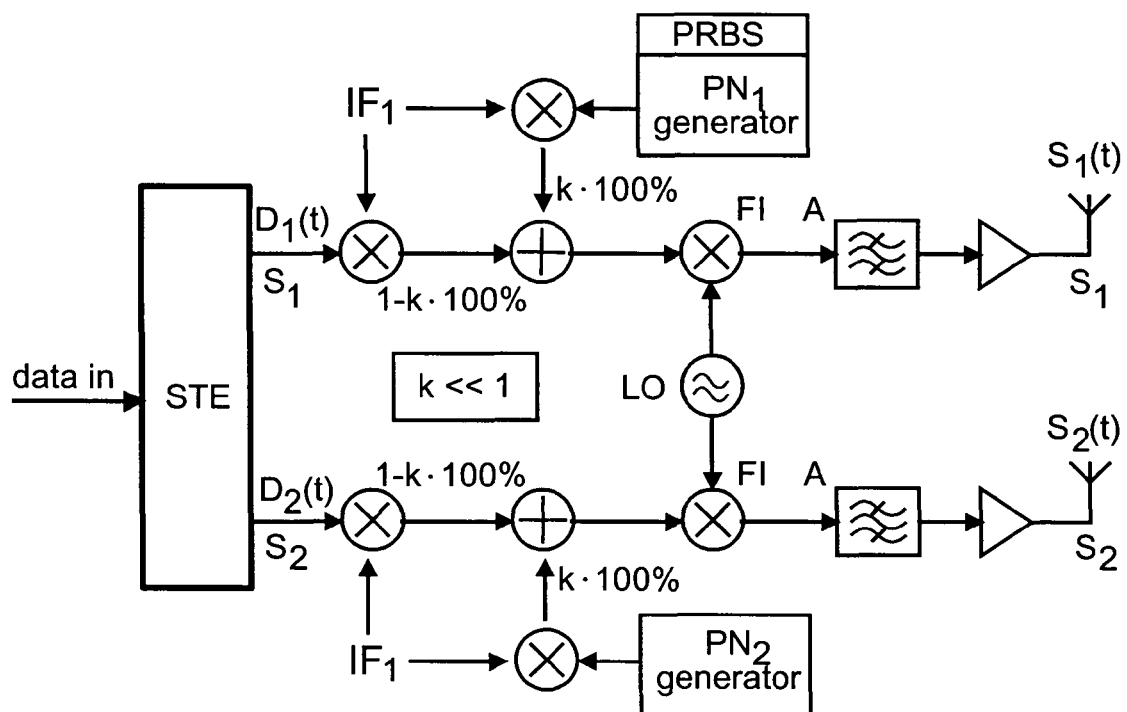
FIG. 3 is the transmission side of the transmission method and system in accordance with the invention.

The new concept of channel matrix measuring will be explained hereafter as the essential component of the wireless transmission method in accordance with the invention. Basically, a modulated weak auxiliary channel carrier is added to each transmission path. Hence, a pilot signal characteristic for each transmission path is superimposed on each data signal. Amplitude and phase of the auxiliary channel carrier associated with each transmission path are then measured on each receiving path. The frequency of the auxiliary channel carrier in particular is identical to the frequency of the carrier for the data transmission (identical channel operation). The concept is exemplarily depicted in FIG. 3 in connection with a transmitter Tx which encodes the transmission signals by means of binary phase modulation (binary phase shift keying—BPSK) as the data modulation format, with two transmission paths or antennae $S_1$, $S_2$ ($S_i$, I=1 ... n, n=2). Initially the incoming data stream data-in is divided in a space-time encoder STE to yield two parallel data subsignals $D_1(t)$, $D_2(t)$. In each transmission path $S_1$, $S_2$ their mean is assumed to be balanced, i.e. the amplitude averaged over a large number of symbols equals nil. It is additionally to be assumed that the chronological sequence of the data subsignals $D_1(t)$, $D_2(t)$ is statistically distributed in a purely random manner, which can be achieved by "scrambling". To each of the data subsignals $D_1(t)$, $D_2(t)$ a different pilot signal $P_1(t)$, $P_2(t)$ is added, the pilot sequences $PN_1$, $PN_2$ (pseudo noise PN) of which are generated by an associated pseudo random generator (generator) for binary symbol sequences (pseudo random binary sequence PRBS) and are modulated onto an mean frequency IF, as a carrier for the data subsignals $D_1(t)$, $D_2(t)$. The pilot signals $P_1(t)$, $P_2(t)$ are very weak so that they do not interfere with the data subsignals $D_1(t)$, $D_2(t)$.

The factor k which describes the amplitude ratio between the superimposed signals is significantly smaller than 1 (k<<1). The superimposed signals are then raised to the transmission band by means of a local frequency generator LO, guided through band filters FI and amplifiers A, and are transmitted into the indoor space As time-dependent transmission signals $S_1(t)$, $S_2(t)$.

For unequivocally distinguishing the marking pilot sequences $PN_i$ of different transmission paths $S_1$ in the receiver RX, it is important to use binary symbol sequences PRBS of good correlation properties. In addition, relatively long code sequences (length L=>$2^{14}$-1=16,383) are required to distinguish the relatively weak pilot signals $P_1(t)$ from the relatively strong transmitted data signals $D_i(t)$ in correlation circuits. Such long binary symbol sequences PRBS may be generated by multiple-feedback shift registers. The actual feedback ratios may be derived from the generally known table of the non-shortenable binary polynomials [7]. There are many possible feedback ratios which generate different sequences of the same maximum length L; but in general the cross correlation of an arbitrary pair of these sequences is not optimal.

A double shift register SR which utilizes a preferred pair of sequences is known from Gold [8]. A whole family of such sequence pairs of good auto and correlation properties can be obtained with the Gold sequence generator. One way of determining the preferred pair is shown in [9]. It is determined by L=16,383. The two preferred polynomials $f_1(x)=x^{14}+X^{10}+x^6+x+1$ and $f_{65}(x)=x^{14}+x^{13}+x^{11}+x^{10}+x^9+x^8+x^6+x^3+x^2+x^1+1$ may be found in the table [7]. The exponents of the polynomials identify tabs in the shift registers SR which are summed by modulo 2 and then feedback to the input of the register. It is to be noted that while they cause a delay, different initial values in the shift register generate identical sequences. "Modulo" is a mathematical direction for determining the whole number remainder of the division of two whole numbers. "Modulo 2" means that an arbitrary real number is rounded up or down, divided by 2, and the remainder is issued as a result of either "1" or "0". In practice, this operation is performed by means of binary XOR gates.

Figure 4:
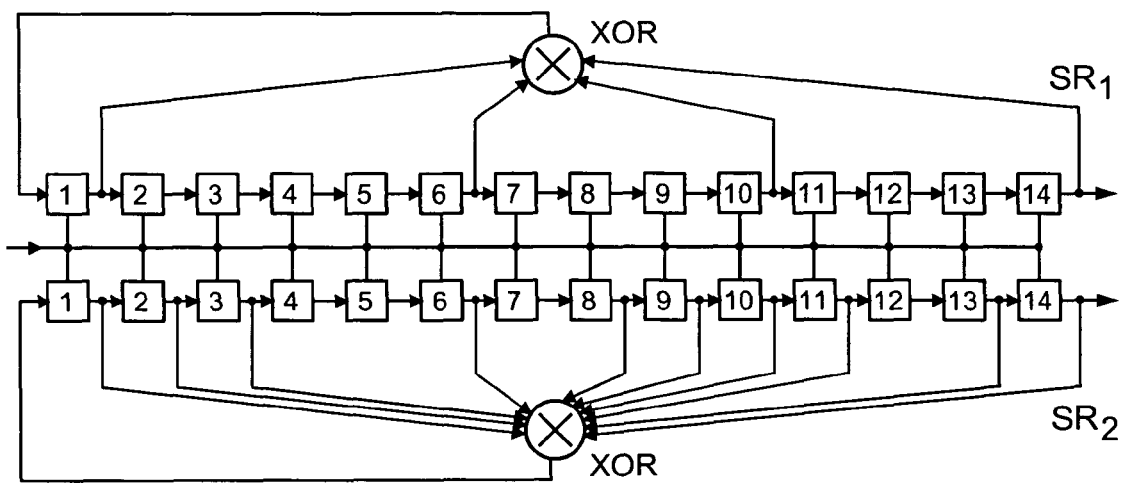
FIG. 4 depicts a generator for generating the PN sequences.
Figure 4:
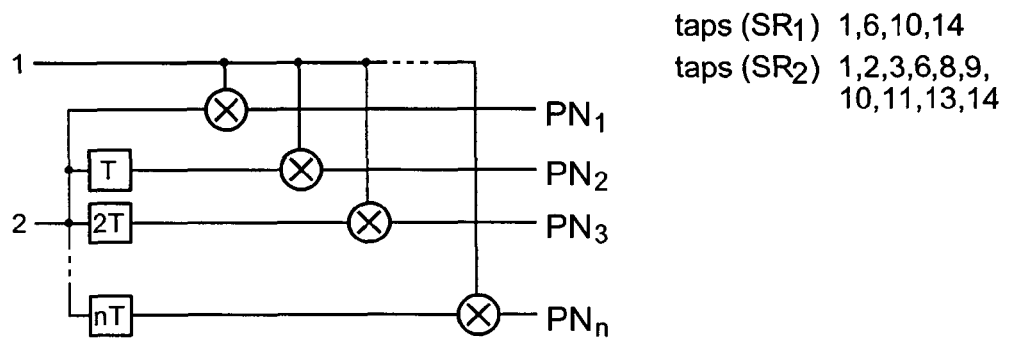

The Gold sequence generator thus set up is depicted in FIG. 4. The output of the lower shift register $SR_2$ is delayed by several chip cycles T (chip=duration of bit) and is then added to the output of the upper shift register $SR_1$. Here, the tabs are 1, 6, 10 and 14. The tabs in the lower shift register $SR_2$ are 1, 2, 3, 6, 8, 9, 10, 11, 13, and 14. By changing the delay between the preferred sequences n<L+2 different Gold sequences ("Gold codes") can be obtained. By computer simulation it was tested that with the arrangement shown in FIG. 3, Gold sequences are obtained which satisfy the following auto (PACF[i] and cross correlation functions (PCCF[i]:

$$PACF[i] = \begin{cases} 16383 : i = 0 \\ \epsilon\{255 \cdot -1, -257\} : i \neq 0 \end{cases}$$

Using pilot signals $P_1(t)$ of identical symbol rates and, especially, of a modulation format of a similar spectral power distribution as in the data $$PCCF[i] = \begin{cases} -1 : 1 = 0 \\ \epsilon\{255 \cdot -1, -257\} : i \neq 0 \end{cases}$$

signals $D_1(t)$, $D_2(t)$ (or in the incoming data stream data-in) is a suitable method of taking into consideration the frequency selective fading in the channel which is usually very strong at an increasing transmission band width. Because of its simplicity, the BPSK technique is preferably used for the channel estimation. It is to be notes that many higher order modulation techniques (QPSK, 8-PSK, 16-QAM, 32-QAM, . . . ) have the same power distribution as the BPSK technique, provided the same symbol rate is utilized. For that reason, a BPSK-based pilot signal modulation can be combined, for instance, with data modulation based on 16-QAM.

The sequence marked pilot signals $P_1(t)$ generate a kind of pseudo accidental noise which is added to the data subsignals $D_i(t)$. This reduces the transmission power somewhat, yet if the power of the pilot signals $P_i(t)$ amounts to only 1% to 10% of the partial data streams $D_i(t)$, its effect on the data transmission is negligibly small. The interference effect may be kept even smaller by subtracting the pilot signals $P_i(t)$ from the reconstructed transmission signals $S_i(t)$ (see FIG. 2).

Measuring the Channel Matrix

Figure 5:
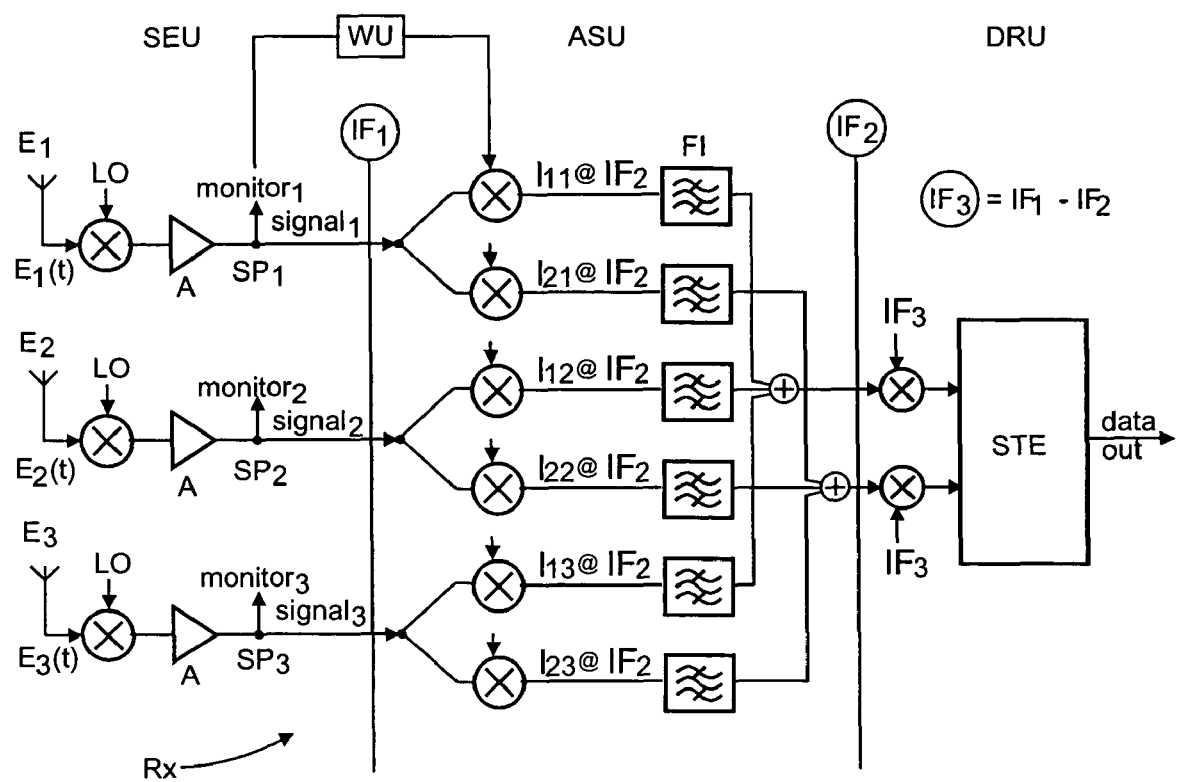
FIG. 5 shows the receiving side of the transmission method and system in accordance with the invention.

FIG. 5 displays a receiver Rx. At the left portion, there is shown a separation unit SEU for the separation into signal and monitor paths, the center portion shows an analog signal combining unit ASU and the right portion shows a data recovery unit DRU. The receiver Rx shown by way of example has three receiving paths or antennae $E_1$, $E_2$, $E_3$ ($E_j$, j=1 . . . m, m=3,). After band lowering by internal oscillators LO, each receiving signal $E_1(t)$, $E_2(t)$, $E_3(t)$ is divided at branches $SP_1$, $SP_2$, $SP_3$ to signal paths signal$_1$, signal$_2$, signal$_3$ and monitor paths $M_1(t)$, $M_2(t)$, $M_3(t)$. The corresponding monitor signals $M_1(t)$, $M_2(t)$, $M_3(t)$ are needed for measuring (estimating) the channel matrix {H}, whereas the receiving signals proper $E_1(t)$, $E_2(t)$, $E_3(t)$ are further processed in an analog signal combining unit ASU.

Figure 6:
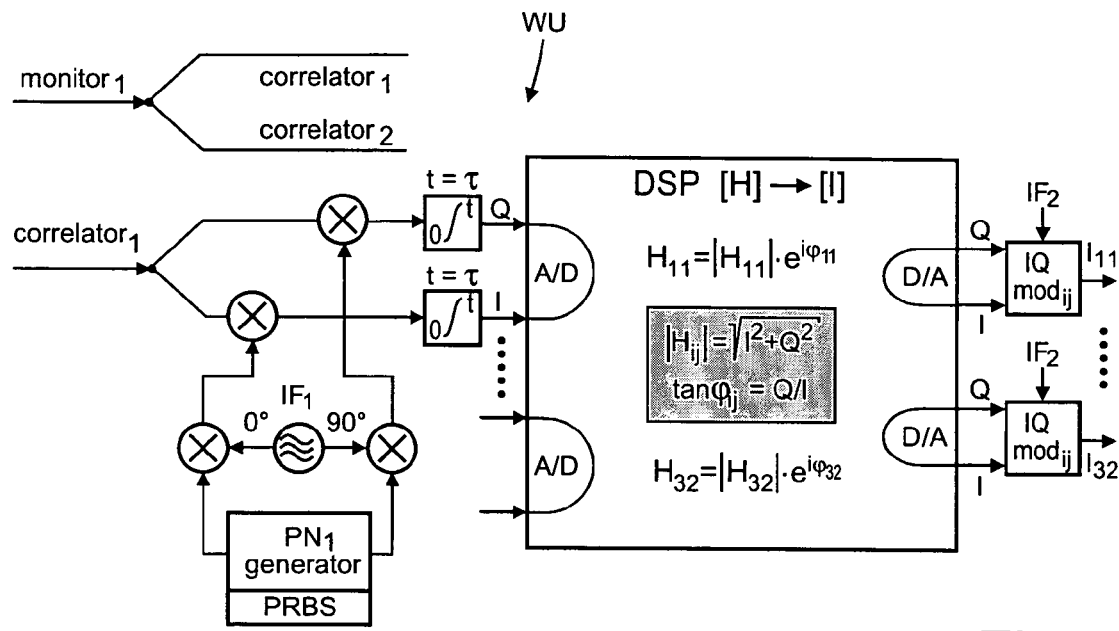
FIG. 6 shows a weighting unit.

FIG. 6 depicts details of a weighting unit WU as a connecting link between the separation unit SEU and the signal combining unit ASU for estimating the channel matrix [H]. In each receiving path $E_1$, $E_2$, $E_3$ the monitoring signals $M_1(t)$, $M_2(t)$, $M_3(t)$ are distributed onto a of correlation circuits correlator$_1$, correlator$_2$ (see upper portion of FIG. 6) the number of which corresponds to the number of transmission antennae $S_1$, $S_2$ (by way of example, two transmission antennae at three receiving antennae) in the transmission system. The number of all correlation circuits correlator$_{ij}$ is the product of multiplying n transmission paths with m receiving paths (each with index I or j). By way of example, the lower portion of FIG. 6 depicts the correlation circuit correlator$_1$ associated with the marking pilot sequence $PN_1$ of the first transmission antenna $S_1$. In synchronism with binary symbol sequence PRBS of the pilot signal $PN_1$ in the received data signal $E_1(t)$, a PRBS generator in the receiver Rx generates the same symbol sequence PRBS in order to generate the same pilot sequence PN1 as on the transmission side. An output of the same phase (o°) and an output phase shifted by 90° of the internal IF1 generator are then each modulated with the pilot sequence PN1 and each of the two resultant signals is multiplied by the monitor signal $M_1(t)$. In this connection, it is to be noted that the monitor signals $M_1(t)$ were mixed down to the subcarrier frequency IF1 before the branch $SP_1$, so the result of the multiplication is a complex valued base band signal. Both superimposed signals are integrated during a full period τ of the symbol sequence PRBS (16,383 chip clock cycles). If during data transmission, the chip rate is 2.5 MHz for instance, a period of 6.5 ms is needed for each new measurement of the channel matrix [H]. This correctly assumes that the conditions for the multi-path transmission channel in the indoor space at 5 Ghz do not significantly change during the duration of this period because of movements of objects at velocities<1 m/s.

The extraction of the pilot signal will now be described in greater detail. The monitor signal $M_1(t)$ arriving at the correlation circuit correlator$_1$, which identical to the receiving signal $E_1(t)$, is a linear combination of two independent data subsignals $D_j(t)$ and two pilot signals $P_j(t)$ $$E_1(t) = \sum_{j=1}^{2} H_{ij} P_j(t)$$

In the embodiment, this is the sum of four BPSK-coded signals on the same carrier frequency ω

$$E_1(t) = \frac{1}{2} \sum_{j=1}^{4} \left[ H_{ij} S_j e^{j(\omega x + \pi x_j(t))} + c.c \right]$$

wherein $x_j(t)$ is the unipolar {0; 1} representation of the data or pilot signals and $H_{1j} = H_{1(j-2)}$ for j>2 and c.c. is the abbreviation for the complex conjugate signal. The summation according (6) runs from j=1 to 4, because the calculation described here for Data and pilot signals is now identical. This assumes that one and the same coherent frequency carrier is used for all transmission paths. The two signals measured behind the integration may be described as follows. In this context the I-signal may be interpreted as the real component and the Q-signal as the imaginary component of the analog measuring voltage.

$$I = \frac{1}{2} \int_0^\tau dt E_1(t) \left[ e^{j(\omega x + \pi x_1(t))} + c.c. \right]$$

$$Q = \frac{1}{2} \int_0^\tau dt E_1(t) \left[ e^{j(\omega x - \frac{\pi}{2} \pi p_1(t))} + c.c. \right]$$

The phase equal I-signal of the first transmission path $S_1$ may be found by insertion of (6) into (7).

$$I = \frac{1}{4}\int_0^\tau dt \left[\left\{\sum_{j=1}^4 H_{1j}S_j\, e^{j(2\omega x + \pi[x_1(t)+P_1(t)])} + c\cdot c\right\} + \left\{\sum_{j=1}^4 H_{1j}S_j\, e^{j\pi[x_j(t)-p_1(t)]} + c\cdot c.\right\}\right]$$

A similar equation results for the Q-signal. The high frequency portion (left bracket) in (9) may be ignored since the integration functions in the manner of a low pass. If the properties of the channel do not change during period τ ($H_{ij}$=constant), the result is integrals structured as $$C = \int_0^\tau dt\, e^{jx[x_j(t)-p_1(t)]},$$

which state whether or no a signal contributes to the measured I and Q values. If $x_j(t)$ is one of the PRBS sequences used for the time expansion of the pilot signal $P_j(t)$, then C is either equal to periodic auto correlation function (PACF(0), j ≠1) or to the cross-correlation function (PCCF(0), j≠1). The prerequisite is, however, that the pilot sequences, which unfold an n-dimensional vector space, be exactly orthogonal and synchronous to each other $\hat{c}=T\delta_{1j}$, $\delta_{1j}$ being the Kronecker symbol of all natural pairs ij for describing matrices of values 1 for I=j and 0 for I≠j. For the Gold sequences here selected, these conditions are satisfied by a very good approximation.

If $x_j(t)$ is an accidentally balanced data sequence, the resultant integral is C=0 at an infinite period of the sequence. For that reason, the accidental data contributions will hereafter be ignored. In that case, the I and Q signals are reduced to:

$$I = \frac{S_1}{4}\mathrm{Re}(H_{11})$$

$$Q = \frac{S_1}{4}\mathrm{Im}\, H_{11})$$

If the pilot signals in the transmitter are of the same amplitude, the amplitude $$|H_{11}| \sim \sqrt{1^2 \alpha Q2}$$

and the phase position $$\Phi_{11} = \arctan\left(\frac{Q}{I}\right)$$

of the element $H_{11}$ of the channel matrix [H] may be measured. The definition of the other matrix elements is carried out analogously thereto.

It is possible, however, with finite sequences sufficiently to suppress the contributions of the data signal to the measured I and Q values as well, since they are not correlated to the pilot sequences. The accidental data signals may then be regarded as a strong noise superimposed on the pilot signals. In the following example, a pilot signal is assumed to have 1% to 10% of the energy of a data signal. Since the data signals are correlated neither accidentally nor amongst each other, the energy of 23 dB is above that of the pilot signal. Following correlation, the pilot signal is amplified by about 10 log (16383)=42 Db, by the gain of expansion, so that with 19 dB, it now contributes more energy to the I and Q signals (or with the 9-fold amplitude) compared to the data signals. It is to be noted that the ratio of energy between partial data and pilot signals must be carefully set (defining the Rice factor k<<1) for low cross-talk and high accuracy during channel measurement. The optimum relationship may be determined by measuring the bit error or by simulation of the entire system. It has already been mention above that while an alternating transmission of the pilot signals the spectral efficiency is again reduced somewhat, but that the amplitude of the pilot signals may be raised (k→1) to compensate.

Circuits similar to the ones shown in FIGS. 5 and 6 are used for separately measuring all elements $H_{11}$. Behind the integrators in FIG. 6 the analog values are read into a signal processor DSP which calculates the weightings for the analog signal combining unit ASU.

Calculation of the Weightings.

It will now be shown how a matching weighting matrix [I] is obtained for the signal combining unit ASU with the measured channel matrix [H]. By multiplying the vector description according to (2) from the left by the weighting matrix [I], the result will be S'=[I][H]S+[W]N=S+[I]N. If noise is absent (n=0) it becomes clear that the weighting matrix [I] is the pseudo inverse of the channel matrix [H] which is defined by $$\sum_{j=1}^m I_{ij} H_{jk} = \delta_{ik}$$

It is to be noted that (14) makes available m×n equations for the m×n elements of the weighting matrix [I], and that there are (m−n)×n degrees of freedom in the calculation of the weighting matrix [I]. If noise is taken into consideration, the selection of an arbitrary weighting matrix [I] satisfying (14), may lead to significant errors in the signal recovery. This is clearly expressed by the additional noise term in S'=S+[I]N which depends upon the actual settings of the free parameters in the weighting matrix [I]. In order to achieve an optimum data transmission, the effect of the noise term [I]N must be minimized. This task is accomplished, for instance, by the Moore-Penrose-pseudo inverses.

Figure 7:
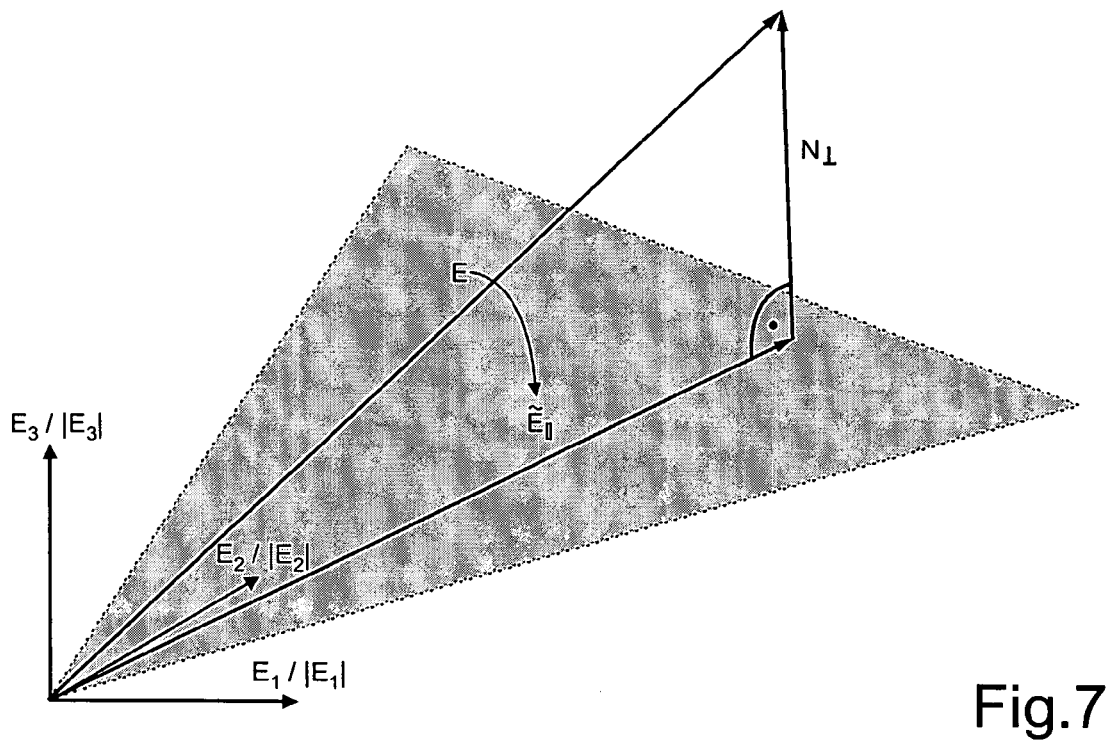
FIG. 7 is a representation of the geometric projection technique.

The effect of this special selection of inverses will now be explained. It is to be noted that (2) describes a transformation between the n-dimensional transmission vector space $\Sigma^{(n)}$ and the m-dimensional receiving vector space $\psi^{(m)}$. In the absence of noise, the receiving vector E will thus be positioned in a hyperplane in the receiving vector space $\psi^{(m)}$ which is unfolded by the column vectors $c_i$ of the channel matrix $[H]=[c_i, \ldots c_n]$ (see FIG. 7). In the presence of noise the receiving vector E will normally be positioned outside of this plane.

The most probable receiving signal $\overline{E}_{11}$ in the hyperplane may then be found by projection of the receiving vector E onto this plane, provided the noise in all receiving paths is of the same characteristic (geometric projection technique). If the normal noise contribution $N_i$ is removed, a one-to-ne relationship will result between the point in the plane and the transmission vector S. It is known from higher linear algebra that the Moor-Penrose pseudo inverses which may be found by means of a singular value breakdown of the complex valued channel matrix, carries out this sought projection. The noise dependent deviation from the original signal is defined correspondingly and may be interpreted as the retransformation of the noise (14) in the plane. If no information regarding the noise characteristic is available, this method which minimizes noise in the receiving space $\psi^{(m)}$, is optimally suitable for the recovery of the transmission vectors S.

Usually, the noise behavior in the receiver is known, however, so that the error in the transmission vector space $\Sigma^{(n)}$ may be further reduced with appropriate processes. Minimizing the mean square deviation (minimum means square estimation MMSE) causes small damage only (14); but it can weigh the residual error during data recovery (cross-talk) relative to the noise proportion. In this manner, it is possible to achieve improved efficiency by an algebraic approach which is hardly more difficult than the multiplication by the Moor-Penrose pseudo inverses.

By contrast, the approach used by the known BLAST method uses a recursive interference extinction following the multiplication by the Moore-Penrose pseudo inverses. As a result of (14), this belated "freeing from interference" is, however, only necessary if there are errors in the measurement of the channel matrix as may be assumed in connection with the known BLAST method. In consequence of the resulting measurement error, a faulty pseudo inverse was here calculated which during reconstruction of the signals led to cross-talk between individual data paths. In the BLAST method, an improved channel estimation would require more time which would further reduce the spectral efficiency. The recursive suppression of interference in the BLAST method at least partially eliminates this undesired cross-talk and, hence, the consequences of a faulty channel measurement. By a significantly improved channel measurement it is thus possible to avoid the recursive error correction which is difficult to implement by hardware. By comparison with the very simple measuring method mentioned in EP A2 0,951,091, the transmission system in accordance with the invention leads to a substantially higher accuracy by utilization of orthogonal PN sequences (Gold sequences) so that complex interference suppression may be dispensed with. In this manner, the reconstruction of the partial transmission signal is substantially simplified by the improved method of measuring the channel matrix. Only in this manner does the purely analog signal reconstruction described in the embodiment become practicable.

The matrix calculation required for (19) is based upon measuring of a mean time value of the channel matrix [H]. Data processing may thus be carried out in a digital signal processor DSP independently of the data transmission. Aside from the required conversions at the input or output from analog to digital and vice versa (A/D or D/A), the digital signal processor DSP shown in FIG. 6 depicts the necessary calculation steps for determining the individual elements $H_{ij}$ of the channel matrix [H] from the parameters I and Q on the basis of which the pseudo inverses are calculated which in turn are passed along to the I-G modulators IG $mod_{ij}$ by way of the analog values I and Q. In the analog signal combining unit ASU the results of the calculation may now be used for executing the final steps of the hardware vector signal recovery, and in particular for the multiplication by the weightings $I_{ij}$ provided in an analog format by the I-Q modulators IQ $mod_{ij}$ and for the summing of the different contributions from all transmission antennae. The number of the required I-Q modulators IQ $mod_{ij}$ corresponds to the number of elements $H_{ij}$ of the channel matrix [H].

Signal Combining Unit.

In addition to the correlation circuit for measuring the channel matrix, the analog signal combining unit ASU in the center of FIG. 5 constitutes a major component of the transmission system in accordance with the invention on the side of the multi-antenna receiver Rx. Since all operations affecting the data path are being realized by hardware, the throughput is not limited by the efficiency of the digital signal processor DSP. It is to be noted at this point that a hardware realization of this kind naturally may also be utilized by transmission systems other than one in accordance with the invention, especially there where data signals from a linear combining network have hitherto been processed exclusively in digital signal processors. Among these are, in particular, so-called "intelligent antenna arrays" (smart antennae) which will find widespread use, for instance, for spatially separating individual participants at the base stations of future mobile wireless systems.

In the concrete example, amplitude and phase of an mean frequency $IF_2$ generated by a separate oscillator are adjusted by the digital signal processor DSP using conventional I-Q modulators IQ $mod_{ij}$ in accordance with every determined weighting $I_{ij}$ (see right side of FIG. 5 and ASU in FIG. 4, here indicated by the expression "$I_{ij}$ @ $IF_2$). Such modulators are known per se are usually used in digital radios for modulating the digital data onto a carrier. It is to be notes that the use of such a simple I-Q modulator constitutes a novel way of weighting antennae in which a signal processor in the data paths becomes unnecessary. Normally, a signal processor in the data path is indispensable in connection with intelligent antenna systems as those of the known BLAST method.

The signals received on the mean frequency IF, are now individually reduced to the intermediate frequencies $IF_3=IF_1-IF_2$ so that the quasi-static amplitude and phase data of the complex weighting $I_{ij}$ of the mean frequency carrier $IF_2$ is transferred to the received signals. The weighted signals on the mean frequency $IF_3$ are then individually filtered in band passes FI and summed to the associated data branch. Finally, the data are for into a space-time decoder STD for recovery.

Design of the System for Higher Efficiency.

In the example described above, the original spectral efficiency of a binary pulse layer modulation (BPSK) is multiplied by a number of two transmission antennae. Assuming single side bands filters at the transmitter and considering that a band width 0.8 times the data rate is required in order reliably to detect the data in the base band, the spectral efficiency at BPSK is 1.25 bit per s and Hz. For this reason, an efficiency of 2.5 bits per s and Hz is realized in the example. The overall efficiency $\eta_{total}$ is increased to $\eta_{total}=n \times \eta_{mod}$ with more transmission antennae or different methods of higher order modulations in the separated partial data streams, wherein n is the number of partial data streams and $\eta_{total}$ is the spectral efficiency of the respective modulation of the partial data streams. At n=8 and $\eta_{mod}=5$ (for instance, in 16-QAM modulation) may lead to a spectral efficiency $\eta_{total}$ of 40 bits per s and Hz. Assuming a natural channel band width of 2 MHz as in the above example, it will be possible at a chip rate of 2.5 MHz to transmit a data rate of 100 Mbit/s. Such a high data rate must be expected of a wireless LAN, as has already been mentioned above. Measured by the present HIPERLAN/2 standard which utilizes a maximum spectral efficiency of 54 Mbit/s and 20 MHz=2.7 bit per s and Hz, it is possible to increase the network capacity by a factor of almost 15 within the same spectral limits, with the transmission method in accordance with the invention and a correspondingly constructed transmission system.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superquide v. DIRECTV, 69 USPQ2d 1865 (Fed. Cir. 2004).

LIST OF REFERENCE CHARACTERS

A Amplifier
ASU analog signal combing unit
correlator$_{ij}$ correlation circuit
data-in incoming data stream
data-out outgoing data stream
DRU Data recovery unit
DSP digital signal processor
D$_i$(t) time dependent data subsignal
E receiving vector
E$_i$ receiving path or antenna
E$_j$(t) time dependent receiving signal
FI band filter
generator pseudo accidental generator
IF$_1$, IF$_2$, IF$_3$ mean frequency
[H] complex valued channel matrix
H$_{ij}$ element of the channel matrix
I$^-$ running index receiving side (j=1 ... n)
I Real portion of the measuring voltage
I$_{ij}$ element of the weighting matrix
I$_{ij}$(t) analog weighting signal
[I] weighting matrix
IQ mod$_{ij}$ I-Q-modulator
j running index receiving side (j=1 ... m)
LO local frequency generator
m number of parallel receiving paths
MIMO multiple-input/multiple-output system
monitor$_j$ monitor path
M$_j$(t) time-dependent monitor signal
N noise vector
n number of parallel transmission paths
PN$_1$ pilot sequence
PRBS pseudo random binary sequence
P$_i$(t) time-dependent pilot signal
Q imaginary portion of the measuring voltage
QAM quadrature amplitude modulation
Rx receiver
SEU separation unit
signal$_j$ signal path
S$_i$(t) time-dependent transmission signal
S$_j$ components of the received transmission vector
SP$_i$ branch
SR shift register
STD space-time decoder
STE space-time encoder
S$_i$ transmission paths or antennae
T chip cycle
tap connection tab
Tx transmitter
TS transmission system
WU weighting unit
XOR exclusive OR gate

LIST OF LITERATURE

[1] Broadband Radio Access Networks (BRAN); HIPER-LAN Type 2, Physical Layer, ETSI Technical Specification 101 475 V1.1.1 (2000-04);

[2] C. Evci et al. AWACS: System description and main project achievements, proc. 4$^{th}$ ACTS Mobile Communications Summit, 1999, vol. 1, pp. 63-69;

[3] T. Kuhwald, H. Boche, A constrained beamforming algorithm for 2D planar antenna arrays, Proc. IEEE Vehicular Technology Conference '99, Amsterdam, pp. 1-3, September 1999;

[4] J. Jelitto, M. Bronzel, G. Fettweis "From Smart Antennas to Reduced Dimension Space-Time Processing", pre-print, to be published in Proc. Europ. Wireless Conf. EW2000, Dresden, Sept. 12-14, 2000;

[5] G. Foschini, Layered Space-Time Architecture for Wireless Communication in a Fading Environment When Using Multiple Antennas, Bell Labs Technical Journal, Vol. 1, No. 2, Autumn 1996, pp. 41-59;

[6] G. D. Golden, G. J. Foschini, R. A. Valenzuela, P. W. Wolniansky, Detecting algorithms and initial laboratory results using V-BLAST space-time communication architecture, Electron Lett. Vol. 35 (1999), pp. 14-15;

[7] W. W. Peterson and E. J. Weldon, Error Correcting Codes, Cambridge, Mass., MIT Press 1972;

[8] R. Gold, Optimal binary sequences for spread spectrum multiplex, IEEE Trans. Inform. Theory, IT-13 (1967), pp. 619-621;

[9] J. S. Lee and L. E. Miller, CDMA Systems Engineering Handbook, Artech House, Boston, London (1998), pp. 656-663.

The invention claimed is:

1. A wireless transmission method for indoor application for a parallel wireless transmission of digital partial data streams formed into a number n of data subsignals by a space-time coding in dependency of the selected data modulation format, in a frequency limited multi-path transmission channel between a number n of transmission paths and a number m (m≧n) receiving paths positioned at different indoor positions, including measurement of the elements of the complex valued channel matrix for estimating the space-time behavior of the transmission channel and space-time signal processing in the receiving paths by determining a weighting matrix derived from the complex valued channel matrix for the simultaneous recovery of the data subsignals, which are reconstructed into their digital partial data streams, characterized by the fact that each transmission channel (S$_i$, I=1 ... n) is marked by an unambiguously recognizable pilot signal (P$_i$(t)) of known structure, encoding, and good correlation properties which is superimposed in a low flow manner on the respective transmitted data subsignal (D$_i$(t)) as a marking pilot sequence ($_{Pni}$) and that the superimposition is transmitted as the transmission signal (S$_i$(t)), that the measuring of the elements (H$_{ij}$) of the complex valued channel matrix ([H]) is executed simultaneously with the parallel transmission of the transmission signal (S$_i$(t)) and is based upon the pilot sequences ($_{Pni}$) the transmitted structures of which are measured in every transmission path (E$_j$, j=1 ... m) and correlated with the known structures, and that each data subsignal (D$_i$(t)) for its recovery is presented as an analog weighted linear combination of all receiving signals (E$_j$(t)), the analog weighting signals (I$_{ij}$(t)) being elements of a weighting matrix ([I]), determined by means of a geometric projection technique of purely algebraic structure from the complex valued channel matrix ([H]).

2. The wireless transmission method of claim 1, wherein the pilot sequences (PN$_i$) are similar in respect of the symbol rate and the efficiency density spectrum resulting from the selected modulation format to the partial data streams based on the data subsignals (D$_i$(t)).

3. The wireless transmission method of claim 2, wherein the the pilot sequences (PN$_i$) are formed as apparently accidental substantially orthogonal binary sequences (PRBS), in accordance, especially, with Gold, and, especially with a sequence length equal to or greater than $2^{14}-1$ bit.

4. The wireless transmission method of claim 3, wherein the the power of the efficiency signals ($P_i(t)$) is in a range of 1 to 10% of the power of the data subsignals.

5. The wireless transmission method of claim 4, wherein the pilot signals ($P_i(t)$) are subtracted from the receiving signals ($E_j(t)$) by the reconstructed transmission signals ($S_i(t)$).

6. The wireless transmission method of claim 5, wherein the Moor-Penrose pseudo inverse of the channel matrix ([H]) or a matrix derived therefrom is used as a weighting matrix ([I]) in the geometric projection technique for reconstructing the data subsignals ($D_i(t)$).

7. The wireless transmission method of claim 6, wherein the corresponding to the real and imaginary portions (I, Q) of a complex valued voltage, two measurement values are generated during the correlation for measuring the elements ($H_{ij}$) of the channel matrix ([H]), which contain the amplitude and phase data of the transmission channel.

8. The wireless transmission method of claim 7, wherein the binary phase modulation, the m-fold phase modulation or the quadrature amplitude modulation is used as modulation format for the data subsignals, whereas the binary phase modulation is used for the pilot signals.

9. Mobile wireless transmission system for indoor applications for the parallel wireless transmission of digital partial data streams in a frequency limited multi-path transmission channel between individual transmission and receiving paths including a transmitter incorporating multi-element antennae for a number n of locally depending parallel transmitters and a space-time-encoding unit in a signal processing unit on the side of transmission, and a receiver including a number of m (m≧n) locally dependent parallel receiving paths, a device including a digital signal processor, for measuring the complex valued channel matrix and a space-time decoding unit in a signal processing unit at the receiving side, the transmitter (Tx) in each transmission path ($S_i$, I=1 ... n) is provided in each transmission path ($S_i$) with a pilot signal generator ($PN_i$ generator) for generating an unambiguously recognizable pilot sequence ($PN_i$) for marking the transmission path ($S_i$) and an input for superimposing a pilot signal ($P_i(t)$ generated from the marking pilot sequence ($PN_i$) on the transmitted data subsignal ($D_i(t)$), the receiver (Rx) in each receiving path ($E_j$, j= 1 ... m) is provided with a branch ($SP_j$) for feeding the respective receiving signal ($E_j(t)$) as a monitor signal ($M_j(t)$) to a weighting unit (WU) for determining analog weighting signals ($I_{ij}$) and, across all receiving paths, with an analog signal processing unit (ASU) into which the analog weighting signals ($I_{ij}$) are fed, and that the weighting unit (WU) is provided with a number correlation circuits ($correlator_{ij}$) corresponding to the number of present transmission paths ($S_i$), each correlation circuit being provided with a pilot signal generator ($PN_i$ generator) for measuring the structure of the respective received pilot signal ($PN_i(t)$) and with a digital signal (DSP) common to all weighting units (WU) for determining the complex valued channel matric ([H]) and the weighting matrix ([I]) resulting therefrom as well as an analog complex value modulator (I-Q $mod_{ij}$) for superimposing the analog weighting signal ($I_{ij}$) on the respective receiving signal ($E_j(t)$).

10. The wireless transmission system of claim 9, wherein the signal generator ($PN_i$) for generating the pilot signal is structured as a pseudo-accidental binary sequence generator (PRBS) with multi-feedback shift registers ($SR_1$, $SR_2$).

* * * * *